US012275331B2

(12) United States Patent
Yokoo

(10) Patent No.: US 12,275,331 B2
(45) Date of Patent: Apr. 15, 2025

(54) REGENERATIVE BRAKING CONTROL SYSTEM

(71) Applicant: Toyota Motor Engineering & Manufacturing North America, Inc., Plano, TX (US)

(72) Inventor: Takehito Yokoo, Aliso Viejo, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 284 days.

(21) Appl. No.: 17/200,848

(22) Filed: Mar. 14, 2021

(65) Prior Publication Data

US 2022/0289036 A1    Sep. 15, 2022

(51) Int. Cl.
*B60L 7/00*        (2006.01)
*B60K 35/00*    (2006.01)
(Continued)

(52) U.S. Cl.
CPC ............... *B60L 7/18* (2013.01); *B60K 35/00* (2013.01); *B60K 35/10* (2024.01); *B60K 2360/11* (2024.01)

(58) Field of Classification Search
CPC ....... B60L 7/18; B60L 2250/24; B60K 35/00; B60K 2370/11; B60K 2370/12; B60K 2370/131; B60K 37/06
See application file for complete search history.

(56) References Cited

U.S. PATENT DOCUMENTS

| 4,095,153 A | 6/1978 | Matty et al. |
| 4,351,405 A | 9/1982 | Fields et al. |

(Continued)

FOREIGN PATENT DOCUMENTS

| CN | 107117173 A | 9/2017 |
| CN | 107150687 A | 9/2017 |

(Continued)

OTHER PUBLICATIONS

Min K, Sim G, Ahn S, Sunwoo M, Jo K. Vehicle Deceleration Prediction Model to Reflect Individual Driver Characteristics by Online Parameter Learning for Autonomous Regenerative Braking of Electric Vehicles. Sensors. 2019; 19(19):4171. https://doi.org/10.3390/s19194171 (Year: 2019).*

(Continued)

*Primary Examiner* — Russell Frejd
*Assistant Examiner* — Brittany Renee Peko
(74) *Attorney, Agent, or Firm* — Christopher G. Darrow; Darrow Mustafa PC

(57) ABSTRACT

A regenerative braking control system for a vehicle can include one or more user interface elements located in a cabin of the vehicle. The one or more user interface elements can correspond to a plurality of regenerative braking settings. Each of the plurality of regenerative braking settings can correspond to a different amount of regenerative braking torque to apply to one or more wheels of the vehicle. The regenerative braking control system can include a processor operatively connected to the user interface elements. The processor can be configured to detect a condition, the condition can be the usage of the plurality of regenerative braking settings by an operator of the vehicle. Responsive to detecting the condition, the processor can be configured to cause the amount of regenerative braking torque for one or more of the plurality of regenerative braking settings to be adjusted based on the condition.

6 Claims, 5 Drawing Sheets

(51) Int. Cl.
*B60L 7/18* (2006.01)
*B60K 35/10* (2024.01)

(56) References Cited

U.S. PATENT DOCUMENTS

| | | | |
|---|---|---|---|
| 5,450,324 | A | 9/1995 | Cikanek |
| 6,033,041 | A | 3/2000 | Koga et al. |
| 6,104,977 | A | 8/2000 | Avery, Jr. |
| 7,034,482 | B2 | 4/2006 | Komiyama et al. |
| 7,362,065 | B2 | 4/2008 | Takano |
| 7,805,235 | B2 | 9/2010 | Sujan et al. |
| 8,215,436 | B2 | 7/2012 | DeGrave et al. |
| 8,483,925 | B2 | 7/2013 | Roll et al. |
| 8,783,396 | B2 | 7/2014 | Bowman |
| 8,977,418 | B2 | 3/2015 | Bissontz |
| 9,694,711 | B2 | 7/2017 | Mitsuoka |
| 10,137,881 | B2 | 11/2018 | Choi |
| 10,525,977 | B2 | 1/2020 | You et al. |
| 10,603,997 | B2 | 3/2020 | Bergstrom et al. |
| 2002/0041167 | A1 | 4/2002 | Kitano et al. |
| 2003/0184147 | A1 | 10/2003 | Perarch |
| 2003/0184154 | A1 | 10/2003 | Joyce |
| 2006/0060399 | A1 | 3/2006 | Tabata et al. |
| 2006/0064225 | A1 | 3/2006 | Tabata et al. |
| 2008/0169144 | A1 | 7/2008 | DeGrave et al. |
| 2009/0066273 | A1 | 3/2009 | Dunn |
| 2011/0174561 | A1 | 7/2011 | Bowman |
| 2011/0233994 | A1 | 9/2011 | Harding et al. |
| 2012/0139328 | A1 | 6/2012 | Brown et al. |
| 2013/0162009 | A1 | 6/2013 | Mitts et al. |
| 2013/0297120 | A1 | 11/2013 | Reed et al. |
| 2013/0317681 | A1 | 11/2013 | Bissontz |
| 2014/0180518 | A1 | 6/2014 | Hayashi |
| 2014/0336860 | A1* | 11/2014 | Saitoh ................ B60L 15/2018 701/22 |
| 2015/0274019 | A1 | 10/2015 | Matsuda |
| 2016/0059857 | A1* | 3/2016 | Ikedaya .......... B60W 30/18127 |
| 2017/0036547 | A1 | 2/2017 | Mizui |
| 2017/0282926 | A1* | 10/2017 | Hashizaka ...... B60W 30/18127 |
| 2018/0015830 | A1 | 1/2018 | Brouwer |
| 2018/0043892 | A1 | 2/2018 | Maeda et al. |
| 2019/0031187 | A1* | 1/2019 | Noguerol ............ B60W 30/025 |
| 2019/0366993 | A1 | 12/2019 | Park |
| 2020/0130694 | A1 | 4/2020 | Jeong |
| 2020/0216087 | A1* | 6/2020 | Kim .................... B60W 50/085 |
| 2020/0207212 | A1 | 7/2020 | Yoshida et al. |
| 2021/0122371 | A1* | 4/2021 | Choi .............. B60W 30/18127 |
| 2021/0163007 | A1* | 6/2021 | Oh ................. B60W 30/18127 |
| 2021/0237581 | A1* | 8/2021 | Rajaie ...................... B60L 7/18 |
| 2022/0105925 | A1 | 4/2022 | Naserian et al. |
| 2022/0289037 | A1 | 9/2022 | Yokoo |
| 2022/0289038 | A1 | 9/2022 | Yokoo |
| 2024/0059159 | A1* | 2/2024 | Schnappauf ........ B60L 15/2063 |

FOREIGN PATENT DOCUMENTS

| | | | | |
|---|---|---|---|---|
| CN | 207291690 U | | 5/2018 | |
| DE | 19849407 A1 | | 12/1999 | |
| EP | 0361708 B1 | | 4/1990 | |
| EP | 2910402 B1 | | 12/2021 | |
| JP | 2004224262 A | | 8/2004 | |
| JP | 2006048494 A | | 2/2006 | |
| JP | 2006290075 A | | 10/2006 | |
| JP | 2016113977 A | | 6/2016 | |
| JP | 2017143685 A | * | 8/2017 | ............... B60L 7/14 |
| JP | 2019115105 A | * | 7/2019 | ............... B60L 7/18 |
| KR | 101824410 B1 | | 2/2018 | |
| KR | 1020170082405 | * | 2/2018 | ............. B60L 15/20 |
| KR | 20200067339 A | | 6/2020 | |
| KR | 102163963 B1 | | 10/2020 | |
| WO | 2013025659 A1 | | 2/2013 | |

OTHER PUBLICATIONS

International Search Report and Written Opinion for International Application No. PCT/US2022/019956, mailed Jul. 6, 2022 (10 pages).

International Search Report and Written Opinion for International Application No. PCT/US2022/019958, mailed Jul. 7, 2022 (11 pages).

International Search Report and Written Opinion for International Application No. PCT/US2022/019964, mailed Jun. 30, 2022 (10 pages).

Extended European Search Report for European Application No. 22771963.0, mailed Feb. 4, 2025 (8 pages).

* cited by examiner

REGENERATIVE BRAKING CONTROL SYSTEM

FIELD

The subject matter described herein relates in general to regenerative braking and, more particularly, to adjusting the regenerative braking characteristics of a vehicle.

BACKGROUND

Heavy-duty vehicles can be equipped with various braking systems. For example, heavy-duty vehicles powered by internal combustion engines can use engine braking systems (also referred to as "exhaust braking," "Jake braking," or "Jacobs braking" systems), in addition to conventional friction or hydraulic braking systems. Engine braking system can slow down the vehicle by opening the exhaust valves of the cylinders after the compression cycle and releasing compressed air trapped in the cylinders. Engine braking systems can be equipped with user-selectable engine braking settings. Each setting can correspond to the application of different amounts of engine braking torque to the wheels of the vehicle. Accordingly, an operator of the vehicle can select when to supplement friction or hydraulic braking with engine braking and also select a specific amount of engine braking torque.

In recent years, heavy-duty vehicles equipped with electric motors instead of internal combustion engines have increased in number. By way of being powered by electric motors, such vehicles, including electric vehicles, hybrid vehicles, and fuel cell vehicles, can employ friction braking systems as well as regenerative braking systems. The regenerative braking system can supplement the friction braking system and can also recoup energy from the moving wheels of the vehicle to use to charge one or more battery-operated systems of the vehicle.

SUMMARY

In one respect, the present disclosure is directed to a regenerative braking control system for a vehicle. The regenerative braking control system can include one or more user interface elements. The one or more user interface elements can be located in a cabin of the vehicle. The one or more user interface elements can correspond to a plurality of regenerative braking settings. Each of the plurality of regenerative braking settings can correspond to a different amount of regenerative braking torque to apply to one or more wheels of the vehicle. The regenerative braking control system can include a processor. The processor can be operatively connected to the user interface elements. The processor can be configured to detect a condition. The condition can be the usage of one or more of the plurality of regenerative braking settings by an operator of the vehicle. Responsive to detecting the condition, the processor can be configured to cause the amount of regenerative braking torque for one or more of the plurality of regenerative braking settings to be adjusted based on the condition.

DETAILED DESCRIPTION

Figure 1:
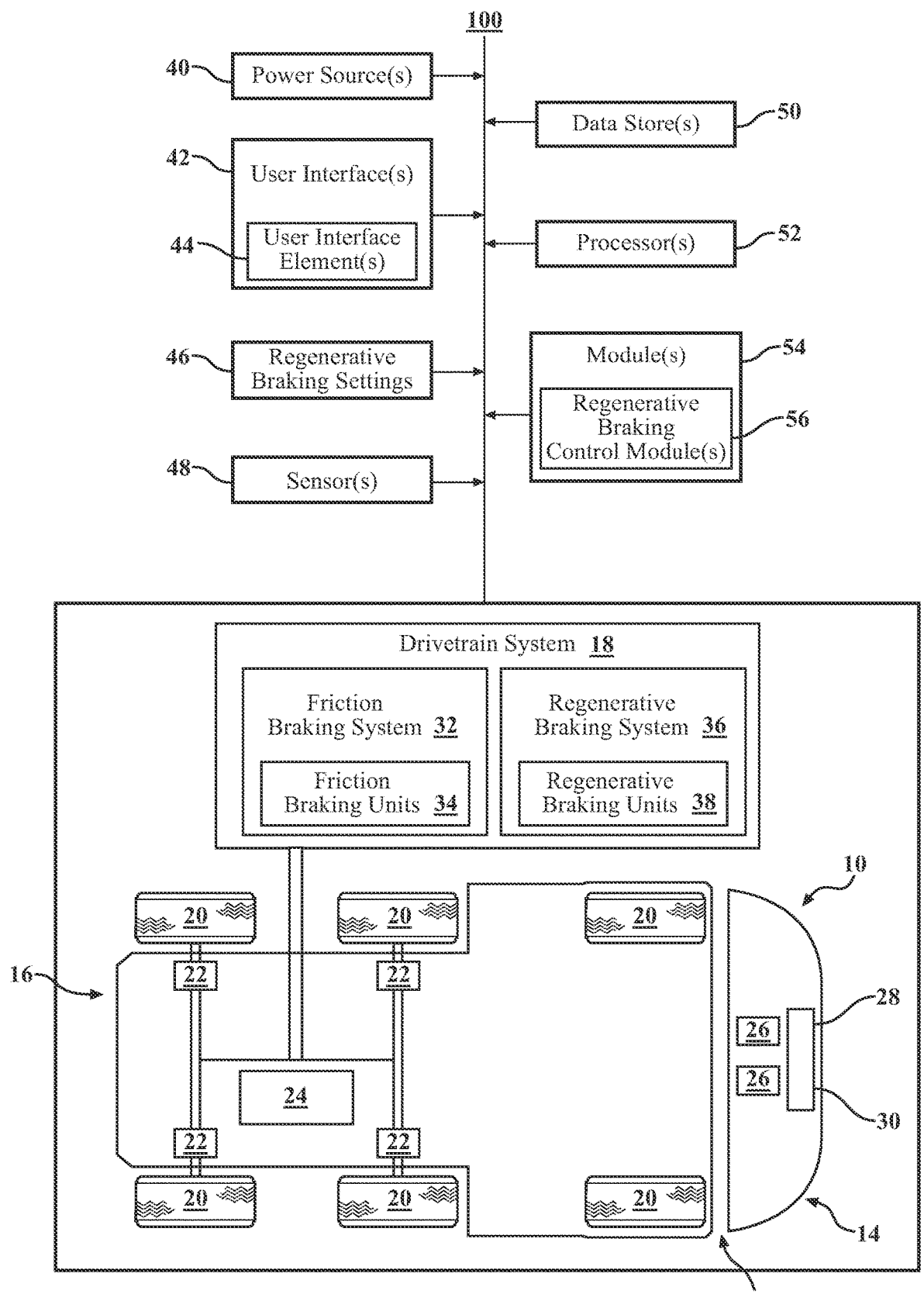
FIG. 1 is an example of a regenerative braking control system for a vehicle.

In heavy-duty vehicles equipped with regenerative braking systems, the use of engine braking systems is not possible because the vehicle does not have an internal combustion engine. Moreover, even if implemented in an electric vehicle, user-selectable regenerative braking settings might not provide similar amounts of regenerative braking torque compared to engine braking torque and/or might not be as operator-friendly as user-selectable engine braking settings. Further, the amounts of regenerative braking torque might be too strong or too weak depending on the preferences of the operator.

Accordingly, arrangements described herein relate to systems and methods for providing user-selectable regenerative braking settings for an electric vehicle that recreate the effect of user-selectable engine braking settings, so that an operator of the electric vehicle may continue to use driving habits and behaviors related to prior diesel engine vehicle driving experience. The regenerative braking settings can be selected through one or more user interface elements and can each correspond to different amounts of regenerative braking torque applied to the wheels of the vehicle. The regenerative braking settings can be adjusted, e.g., the amount of regenerative braking torque can be increased or decreased for one or more of the regenerative braking settings. As described herein, a regenerative braking control system can adjust the amount of regenerative braking torque for one or more of the regenerative braking settings based on the usage of the regenerative braking settings by the operator.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of at least a portion of a regenerative braking control system 100 for a vehicle 10 is shown. The regenerative braking control system 100 can be implemented in any suitable vehicle 10. For example, the regenerative braking control system 100 can be implemented in an electric vehicle (EV), a hybrid electric vehicle (HEV), or a fuel cell vehicle (FCV).

The vehicle 10 can include a body 12, a passenger compartment 14, a cargo compartment 16, and a drivetrain system 18. The drivetrain system 18 can include wheels 20, one or more motors 22, one or more motive power sources 24, one or more pedals 26, a dashboard 28, and an instrument panel 30. The wheels 20 can be configured to support the vehicle 10 and the motor(s) 22 can be configured to propel or slow the wheels 20. The motive power source(s) 24 can include one or more batteries and/or one or more fuel cells for providing power to the motor(s) 22. The pedal(s) 26 can include a brake pedal and an accelerator pedal. The dashboard 28 can be located in the passenger compartment 14. In some arrangements, the instrument panel 30 can be a part of the dashboard 28.

The drivetrain system 18 can include a friction braking system 32. The friction braking system 32 can include a plurality of friction braking units 34. Each friction braking unit 34 can be operatively connected to one of the wheels 20. The friction braking unit(s) 34 can include any systems, components, apparatus, etc. of any type of friction braking system, now known or later developed. For example, each friction braking unit 34 can include a brake disk, a brake caliper, and a brake pad. Each friction braking unit 34 can be operatively connected to the brake pedal. When an operator of the vehicle 10 engages the brake pedal, the brake caliper can compress, causing the brake pad to contact the brake disk, thereby slowing the wheel 20.

The drivetrain system 18 can also include a regenerative braking system 36. The regenerative braking system 36 can include one or more regenerative braking units 38. The regenerative braking unit(s) 38 can include any systems, components, apparatus, etc. of any type of regenerative braking system, now known or later developed. For example, the regenerative braking unit(s) 38 can include the wheels 20, the motor(s) 22, and the motive power source(s) 24 of the drivetrain system 18. The regenerative braking unit(s) 38 can be operatively connected to the pedal(s) 26, for example, the brake pedal and/or the accelerator pedal. The regenerative braking system 36 can also include one or more inverters. When an operator of the vehicle 10 disengages the accelerator pedal or engages the brake pedal, the inverter(s) can be configured to cause the magnetic field generated in coil(s) of the motor(s) 22 to be deactivated. As a result, the motor(s) 22 no longer drive the wheels 20. Instead, the motor(s) 22 are driven by the rotation of the wheels 20. Thus, the motor(s) 22 can begin to act as a generator, generating electrical energy. As such, the motor(s) 22 can be configured to supply generated energy to the batteries, motive power source(s) 24, and/or power sources 40. The wheels 20 are then slowed by friction acting between the wheels 20 and the road, thereby slowing the vehicle 10.

In addition to the elements described above, the regenerative braking control system 100 can also include one or more power sources 40, one or more user interfaces 42, one or more user interface elements 44, one or more regenerative braking settings 46, one or more sensors 48, one or more data stores 50, one or more processors 52, and one or more modules 54, and one or more regenerative braking control modules 56.

It will be understood that it is not necessary for the regenerative braking control system 100 to have all of the elements shown in FIG. 1 or described herein. The regenerative braking control system 100 can have any combination of the various elements shown in FIG. 1. Further, the regenerative braking control system 100 can have additional elements to those shown in FIG. 1. In some arrangements, the regenerative braking control system 100 may not include one or more of the elements shown in FIG. 1. Further, the elements shown may be physically separated by large distances. Some of the possible elements of the regenerative braking control system 100 are shown in FIG. 1 and will now be described.

The various elements of the regenerative braking control system 100, for example, the drivetrain system 18, the friction braking system 32, the regenerative braking system 36, the power source(s) 40, the user interface(s) 42, the user interface element(s) 44, the sensor(s) 48, the data store(s) 50, the processor(s) 52, and/or the module(s) 54 can be communicatively linked to one another or one or more other element(s) through one or more communication networks. The term "communicatively linked," as used herein, can include direct or indirect connections through a communication channel, bus, pathway, or another component or system. The term "communication network," as used herein, means one or more components designed to transmit and/or receive information from one source to another. The elements of the vehicle can include and/or execute suitable communication software, which enables the various elements to communicate with each other through the communication network and perform the functions disclosed herein.

The communication network(s) can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network(s) can be implemented as or include one or more wireless networks, whether short range (e.g., a local wireless network built using a Bluetooth or one of the IEEE 802 wireless communication protocols, e.g., 802.11 a/b/g/l, 802.15, 802.16, 802.20, Wi-Fi Protected Access (WPA or WPA2) or long range (e.g., a mobile, cellular, and/or satellite-based wireless network; GSM, TDMA, CDMA, WCDMA networks, or the like). The communication network(s) can include wired communication links and/or wireless communication links. The communication network(s) can include any combination of the above networks and/or other types of networks.

As noted above, the regenerative braking control system 100 can include one or more power sources 40. The power source(s) 40 can be any power source capable of and/or configured to energize the vehicle 10 and the elements thereof. For example, the power source(s) 40 can include one or more batteries, one or more fuel cells, one or more generators, one or more alternators, one or more solar cells, and combinations thereof. In one arrangement, the power source(s) 40 can be the motive power source(s) 24 of the vehicle 10.

As noted above, the regenerative braking control system 100 can include one or more user interfaces 42. The user interface(s) 42 can be provided on and operatively connected to the vehicle 10 at any suitable location. For example, the user interface(s) 42 can be a part of the dashboard 28 and/or the instrument panel 30.

Figure 2A:
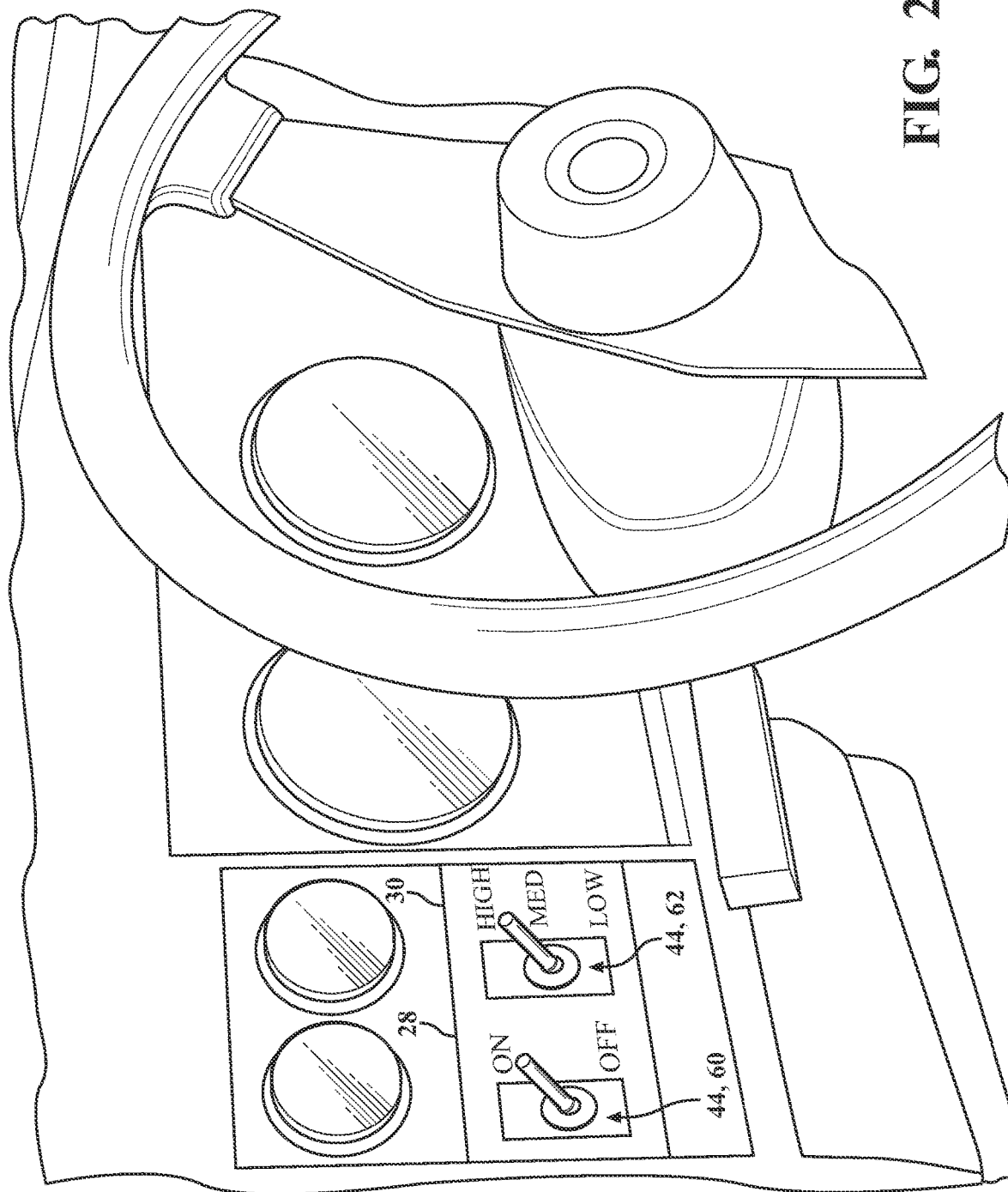
FIG. 2A is an example of one or more user interface elements of a regenerative braking control system.
Figure 2B:
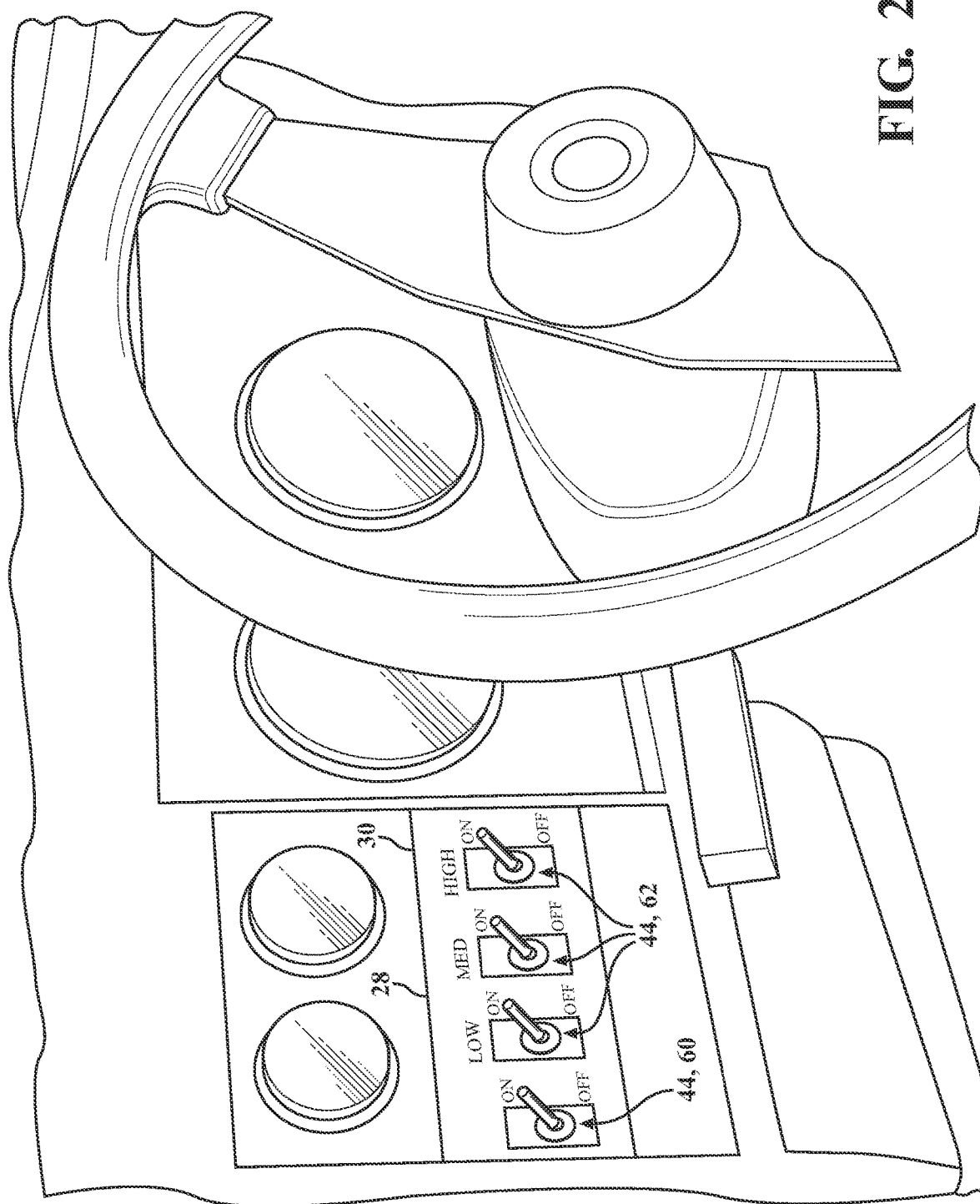
FIG. 2B is an example of one or more user interface elements of a regenerative braking control system.
Figure 2C:
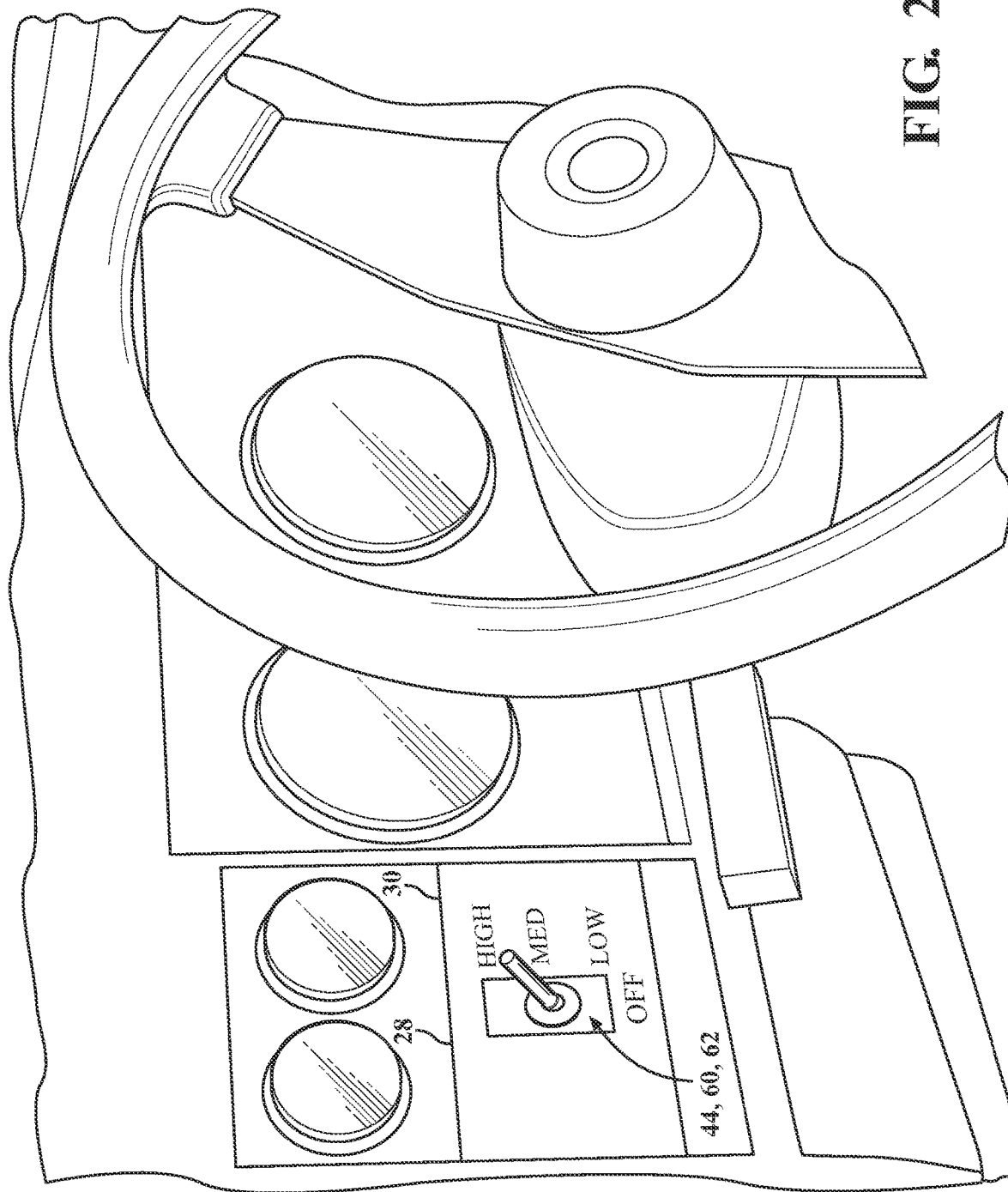
FIG. 2C is an example of one or more user interface elements of a regenerative braking control system.
Figure 3:
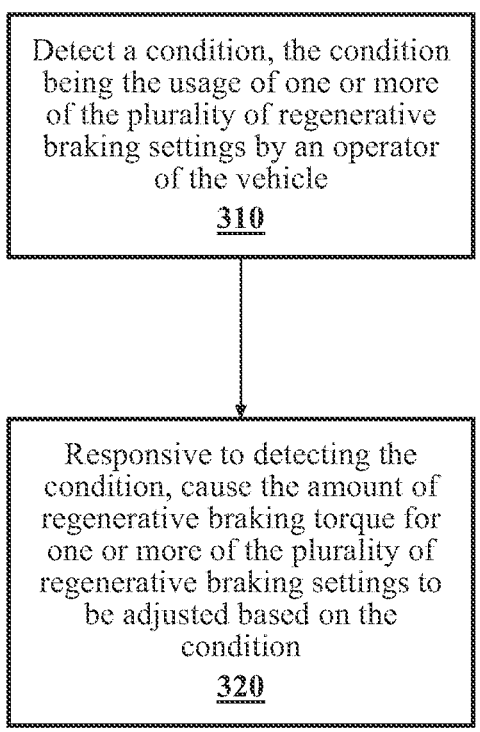
FIG. 3 is an example of a method for controlling regenerative braking in a vehicle.

Referring to FIGS. 2A-2C, the user interface(s) 42 can include one or more user interface element(s) 44. The user interface element(s) 44 can be any suitable manual user interface element(s). For example, as shown in FIGS. 2A-2C, the user interface element(s) 44 can be one or more switches. In other examples, the user interface element(s) 44 can be one or more buttons, one or more dials, one or more levers, one or more knobs, one or more keys, one or more selectors, one or more actuators, any other suitable user interface element(s), and/or any combination of the foregoing. Additionally or alternatively, the user interface element(s) 44 can be any suitable digital or graphical user interface element(s). For example, the user interface element(s) 44 can be one or more screens or one or more touch screens.

The user interface element(s) 44 can correspond to one or more regenerative braking settings 46. Each of the regenerative braking settings 46 can be user-selectable. Each of the regenerative braking settings 46 can correspond to a different, predetermined amount of regenerative braking torque applied to the wheel(s) 20. In one or more arrangements, the regenerative braking control system 100 can include three regenerative braking settings 46. In such arrangements, a first (LOW) regenerative braking setting 46 can correspond to a low amount of regenerative braking torque, a second (MEDIUM) regenerative braking setting 46 can correspond to a medium amount of regenerative braking torque, and a third (HIGH) regenerative braking setting 46 can correspond to a high amount of regenerative braking torque. In some arrangements, a low amount of regenerative braking torque can correspond to about a 10% reduction of braking power, a medium amount of regenerative braking torque can correspond to about a 15% reduction of braking power, and a high amount of regenerative braking torque can correspond to about a 20% reduction of braking power. In another or more arrangements, the regenerative braking settings 46 can correspond to any suitable amount of regenerative braking torque and/or reduction of braking power. In some arrangements, the user interface element(s) 44 can correspond to any suitable number of regenerative braking settings 46. In some arrangements, the regenerative braking settings 46 can represent ranges. The ranges may or may not overlap with each other. In some arrangements, the regenerative braking settings 46 can correspond to a range of regenerative braking torque between the lowest regenerative braking setting 46 and the highest regenerative braking setting 46.

Referring to FIGS. 2A-2C, the user interface element(s) 44 can include any suitable number of user interface element(s) 44 for controlling the regenerative braking settings 46. In some arrangements, the user interface element(s) 44 can include an ON/OFF switch 60. The ON/OFF switch 60 can be configured to selectively enable and/or disable the application of regenerative braking torque to the wheels 20. In some arrangements, the user interface elements(s) 44 can include one or more level selector switches 62. The level selector switch(es) 62 can be configured to vary the amount of regenerative braking torque applied to the wheel(s) 20.

The user interface element(s) 44 can include any suitable combination of ON/OFF switch(es) 60 and/or level selector switch(es) 62. For example, as shown in FIG. 2A, the user interface element(s) 44 can include one ON/OFF switch 60 and one level selector switch 62. The level selector switch 62 can have three positions (LOW, MEDIUM, and HIGH) corresponding to three regenerative braking settings 46. In another example, as shown in FIG. 2B, the user interface element(s) 44 can include one ON/OFF switch 60 and a plurality of level selector switches 62. In the example shown in FIG. 2B, the level selector switches 62 can be three level selector switches. Each level selector switch can correspond to three regenerative braking settings 46. In another example, as shown in FIG. 2C, the user interface element(s) 44 can include a combination ON/OFF and level selector switch 60, 62, where the switch has four positions (OFF, LOW, MEDIUM, and HIGH) corresponding to an OFF setting and three regenerative braking settings 46. Of course, it will be understood that the arrangements shown in FIGS. 2A-2C are merely examples and that other arrangements are possible.

The regenerative braking settings 46 can provide various levels of regenerative braking torque to be applied to the wheels 20. As such, the operator can control the feel of the braking system according to his or her driving style. However, in some arrangements, an operator might find that the predetermined amounts of regenerative braking torque for each regenerative braking setting 46 are too strong or too weak. If some of the regenerative braking settings 46 are too strong or too weak for the operator's preferences, the operator might not use all of the regenerative braking settings 46. For example, the operator might use only one or two regenerative braking settings 46, even when there are three or more regenerative braking settings 46. As such, the operator would not realize the benefits of using all of the regenerative braking settings 46.

Accordingly, the predetermined amounts of regenerative braking torque corresponding to the regenerative braking setting(s) 46 can be adjusted. As described herein, the predetermined amounts of regenerative braking torque for the regenerative braking setting(s) 46 can be adjusted based on the usage of the regenerative braking setting(s) 46 by the operator. The adjustments can be made automatically by the regenerative braking control system 100. The adjustments can be made dynamically in real-time during operation of the vehicle or over the course of numerous driving events.

Referring back to FIG. 1, the regenerative braking control system 100 can include one or more sensors 48. The term "sensor," as used herein, can include any device, component, and/or system that can detect, determine, assess, monitor, measure, quantify, acquire, and/or sense something. The sensor(s) 48 can detect, determine, assess, monitor, measure, quantify, acquire, and/or sense in real-time. The term "real-time," as used herein, can mean a level of processing responsiveness that a user or system senses as sufficiently immediate for a particular process or determination to be made, or that enables the processor to keep up with some external process. The sensor(s) 48 can be operatively connected to the user interface(s) 42, the user interface element(s) 44, the data store(s) 50, the processor(s) 52, and/or other elements of the vehicle 10.

The sensor(s) 48 can include any suitable type of sensor. The sensor(s) 48 can detect, determine, assess, monitor, measure, quantify, and/or sense information about the vehicle 10 itself (e.g., position, orientation, speed, etc.). The sensor(s) can also detect, determine, assess, monitor, measure, quantify, acquire, and/or sense data or information about the external environment in which a vehicle 10 is located or one or more portions thereof.

The sensor(s) 48 can be configured to detect and/or acquire data about the usage of the user interface element(s) 44, and accordingly, the usage of the regenerative braking settings 46, by the operator. For example, the sensor(s) 48 can be configured to detect and/or acquire data about when each regenerative braking setting 46 is used and for how long each regenerative braking setting 46 is used. The sensor(s) 48 can also be configured to detect and/or acquire data about when and how often the operator switches between regenerative braking settings 46. The sensor(s) 48 can also be configured to detect and/or acquire data about usage patterns by the operator.

As noted above, the regenerative braking control system 100 can include one or more data stores 50. The data stores(s) 50 can include volatile and/or non-volatile memory. Examples of suitable data stores include RAM (Random Access Memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 50 can be a component of the processor(s) 52, or the data store(s) 50 can be operatively connected to the processor(s) 52 for use thereby. The data store(s) 50 can be configured to store data from the sensor(s) 48.

As noted above, the regenerative braking control system 100 can include one or more processors 52. As used herein, the term "processor" can mean any component or group of components that are configured to execute any of the processes described herein or any form of instructions to carry out such processes or cause such processes to be performed. The processor(s) 52 can be implemented with one or more general-purpose processor(s) and/or one or more special-purpose processor(s). Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 52 can include at least one hardware circuit (e.g., an integrated circuit) configured to carry out instructions contained in program code. In arrangements in which there is a plurality of processors 52, the processors 52 can work independently from each other or one or more processors 52 can work in combination with each other. The processor(s) 52 can be configured to receive data from the sensor(s) 48 and/or the data store(s) 50.

As noted above, the regenerative braking control system 100 can include one or more modules 54. The module(s) 54 can be implemented as computer readable program code that, when executed by the processor(s) 52, implement one or more of the various processes described herein. The module(s) 54 can be a component of the processor(s) 52, or the module(s) 54 can be executed on and/or distributed among other processing systems to which the processor(s) 52 is operatively connected. The module(s) 54 can include instructions (e.g., program logic) executable by the processor(s) 52. Alternatively or additionally, the data store(s) 50 may contain such instructions. In one or more arrangements, the module(s) 54 described herein can include artificial or computational intelligence elements, e.g., neural network, fuzzy logic, or other machine learning algorithms. Further, in one or more arrangements, the module(s) 54 can be distributed among a plurality of modules 54. In one or more arrangements, two or more of the modules 54 described herein can be combined into a single module.

As a part of the module(s) 54, the vehicle can include one or more regenerative braking control modules 56. The regenerative braking control module(s) 56 can include profiles and logic for analyzing data from the sensor(s) 48 and/or the data store(s) 50. The regenerative braking control module(s) 56 can be configured to detect a condition based on the data. For example, the regenerative braking control module(s) 56 can be configured to determine the usage of the regenerative braking settings 46 by the operator. For example, the regenerative braking control module(s) 56 can be configured to determine if the operator is using less than all of the regenerative braking settings 46. In another example, the regenerative braking control module(s) 56 can be configured to determine if the operator is switching rapidly between the regenerative braking settings 46. In still another example, the regenerative braking control module(s) 56 can be configured to determine if the operator is using the regenerative braking settings 46 according to a pattern. The detection of the condition can occur continuously, periodically, irregularly, or even randomly. The detection of the condition can be for any suitable period of time, such overall usage, usage for a particular time segment (e.g., year, month, week, day, portion of a day, minutes, seconds, etc.).

The regenerative braking control module(s) 56 can include profiles and logic for adjusting the amount of regenerative braking torque for the regenerative braking setting(s) 46 based on the condition. The regenerative braking control module(s) 56 can adjust the amount of regenerative braking torque for the regenerative braking setting(s) 46 in any suitable manner. In one example, the regenerative braking control module(s) 56 can adjust the amount of regenerative braking torque for the regenerative braking setting(s) 46 continuously while the vehicle is in use. In another example, the regenerative braking control module(s) 56 can adjust the amount of regenerative braking torque for the regenerative braking setting(s) 46 using a one-time calibration.

To adjust the amount of regenerative braking torque for the regenerative braking setting(s) 46, the regenerative braking control module(s) 56 can be configured to control the amount of energy supplied from the motor(s) 22 to the batteries, motive power source(s) 24, and/or power sources 40. The amount of energy supplied can be controlled by the inverter(s). The amount of energy supplied from the motor(s) 22 to the batteries, motive power source(s) 24, and/or power sources 40 affects the amount of regenerative braking torque. For example, when the regenerative braking control module(s) 56 determines that the amount of regenerative braking torque for the braking setting(s) 46 should be increased, the regenerative braking control module(s) 56 can be configured to increase the amount of energy supplied from the motor(s) 22 to the batteries, motive power source(s) 24, and/or power source(s) 40. In another example, when the regenerative braking control module(s) 56 determines that the amount of regenerative braking torque for the braking setting(s) 46 should be decreased, the regenerative braking control module(s) 56 can be configured to decrease the amount of energy supplied from the motor(s) 22 to the batteries, motive power source(s) 24, and/or power source(s) 40.

The regenerative braking control module(s) 56 can adjust the amount of regenerative braking torque for the regenerative braking setting(s) 46 based on the usage of the regenerative braking setting(s) 46 by the operator. In one or more arrangements, the regenerative braking control module(s) 56 can detect a condition in which the operator is using only one of the regenerative braking settings 46 and adjust the amount of regenerative braking torque for the regenerative braking setting(s) 46. For example, if the regenerative braking control system 100 includes three regenerative braking settings 46, and the operator uses only the lowest regenerative braking setting 46, e.g., the LOW regenerative braking setting 46, the regenerative braking control module(s) 56 can determine that the amounts of regenerative braking torque for the two highest regenerative braking settings 46, e.g., the MEDIUM regenerative braking setting 46 and the HIGH regenerative braking setting 46, are too high. Accordingly, the regenerative braking control module(s) 56 can decrease the amount of regenerative braking torque for each of the regenerative braking settings 46, or the regenerative braking control module(s) 56 can decrease the amount of regenerative braking torque for the two highest regenerative braking settings 46. In another example, if the regenerative braking control system 100 includes three regenerative braking settings 46, and the operator uses only the medium regenerative braking setting 46, e.g., the MEDIUM regenerative braking setting 46, the regenerative braking control module(s) 56 can determine that the range of regenerative braking torque between the lowest regenerative braking setting 46 and the highest regenerative braking setting 46 is too large. Accordingly, the regenerative braking control module(s) 56 can decrease the range of regenerative braking torque between the lowest regenerative braking setting 46 and the highest regenerative braking setting 46. In another example, if the regenerative braking control system 100 includes three regenerative braking settings 46, and the operator uses only the highest regenerative braking setting 46, e.g., the HIGH regenerative braking setting 46, the regenerative braking control module(s) 56 can determine that the amounts of regenerative braking torque for the two lowest regenerative braking settings 46, e.g., the MEDIUM regenerative braking setting 46 and the HIGH regenerative braking setting 46, are too low. Accordingly, the regenerative braking control module(s) 56 can increase the amount of regenerative braking torque for each of the regenerative braking settings 46, or the regenerative braking control module(s) can increase the amount of regenerative braking torque for the two lowest regenerative braking settings 46.

In one or more arrangements, the regenerative braking control module(s) 56 can detect a condition in which the operator is using less than all of the regenerative braking settings 46, and the regenerative braking control module(s) 56 can adjust the amount of regenerative braking torque the regenerative braking setting(s) 46. For example, if the regenerative braking control system 100 includes three regenerative braking settings 46, and the operator only uses the two lowest regenerative braking settings 46, e.g., the LOW regenerative braking setting 46 and the MEDIUM regenerative braking setting 46, the regenerative braking control module(s) 56 can determine that the amount of regenerative braking torque for each of the regenerative braking settings 46 is too high. Accordingly, the regenerative braking control module(s) 56 can decrease the amount of regenerative braking torque for each of the regenerative braking settings 46. In another example, if the regenerative braking control system 100 includes three regenerative braking settings 46, and the operator only uses the two highest regenerative braking settings 46, e.g., the MEDIUM regenerative braking setting 46 and the HIGH regenerative braking setting 46, the regenerative braking control module(s) 56 can determine that the amount of regenerative braking torque for each of the regenerative braking settings 46 is too low. Accordingly, the regenerative braking control module(s) 56 can increase the amount of regenerative braking torque for each of the regenerative braking settings 46. In another example, if the regenerative braking control system 100 includes three regenerative braking settings 46, and the operator only uses the lowest regenerative braking setting 46 and the highest regenerative braking setting 46, the regenerative braking control module(s) 56 can determine that the range of regenerative braking torque between the lowest regenerative braking setting 46 and the highest regenerative braking setting 46 is too small. Accordingly, the regenerative braking control module(s) 56 can increase the range of regenerative braking torque between the lowest regenerative braking setting 46 and the highest regenerative braking setting 46.

In other arrangements, the regenerative braking control module(s) 56 can detect a condition in which the operator is rapidly switching between two or more of the regenerative braking settings 46, and the regenerative braking control module(s) 56 can adjust the amount of regenerative braking torque for the regenerative braking setting(s) 46. As used herein, the term "rapidly switching" means switching between two or more of the regenerative braking settings 46 at a frequency higher than a predetermined rate, for example, at a frequency of at least about 3 times per minute or at least about 3 times per some other segment of time. For example, if the regenerative braking control system 100 includes three regenerative braking settings 46, and the operator is switching rapidly between the two lowest regenerative braking settings 46, e.g., the LOW regenerative braking setting 46 and the MEDIUM regenerative braking setting 46, the regenerative braking control module(s) 56 can determine that the range of regenerative braking torque between those two regenerative braking settings 46 is too high. Accordingly, the regenerative braking control module(s) 56 can decrease the range of regenerative braking torque between those two regenerative braking settings 46. In another example, if the regenerative braking control system 100 includes three regenerative braking settings 46, and the operator is switching rapidly between the two highest regenerative braking settings 46, e.g., the MEDIUM regenerative braking setting 46 and the HIGH regenerative braking setting 46, the regenerative braking control module(s) 56 can determine that the range of regenerative braking torque between those two regenerative braking settings 46 is too high. Accordingly, the regenerative braking control module(s) 56 can decrease the range of regenerative braking torque between those two regenerative braking settings 46. In another example, if the regenerative braking control system 100 includes three regenerative braking settings 46, and the operator is switching rapidly between the lowest regenerative braking setting 46 and the highest regenerative braking setting 46, e.g. the LOW regenerative braking setting 46 and the HIGH regenerative braking setting 46, the regenerative braking control module(s) 56 can determine that the range of regenerative braking torque across all three regenerative braking settings 46 is too low. Accordingly, the regenerative braking control module(s) 56 can increase the range of regenerative braking torque across all three regenerative braking settings 46.

Now that the various potential systems, devices, elements, and/or components have been described, a method, including various possible steps of such method, will now be described. The method described may be applicable to the arrangements described above, but it is to be understood that the method can be carried out with other suitable systems and arrangements. Moreover, the method may include other steps that are not shown here, and in fact, the method is not limited to including every step shown. The blocks that are illustrated here as part of the method are not limited to the particular chronological order. Indeed, some of the blocks may be performed in a different order than what is shown and/or at least some of the blocks shown can occur simultaneously.

Referring to FIG. 3, an example of a method 300 is shown. At block 310, a condition can be detected. As described herein, the condition can be the usage of the regenerative braking setting(s) 46 by the operator. The detection can be performed by the processor(s) 52 and/or the regenerative braking control module(s) 56. The detection can be based on sensor data acquired by the sensor(s) 48. The method 300 can continue to block 320.

At block 320, responsive to detecting the condition, the amount of regenerative braking torque for the regenerative braking setting(s) 46 can be caused to be adjusted based on the condition. The causing can be performed by the processor(s) 52 and/or the regenerative braking control module(s) 56. The method can return to block 310 or proceed to some other block.

The arrangements described herein can provide the benefit of providing user-selectable regenerative braking settings to the operator of an electric vehicle. Moreover, the arrangements described herein can provide the benefit of adjusting the regenerative braking settings based on the usage of the regenerative braking settings by the operator, in order to optimize regenerative braking and/or customize the regenerative braking settings according to the operator's preferences. Accordingly, the arrangements described herein can broaden an operator's usage of the regenerative braking settings and can allow an operator to use braking habits and behaviors from previous diesel engine driving experience in electric vehicles.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the function(s) noted in the block diagrams may occur out of the order noted in the figures. For example, two blocks shown in succession may, in fact, be executed substantially concurrently, or the blocks may sometimes be executed in the reverse order, depending on the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suitable. A typical combination of hardware and software can be a processing system with computer-useable program code that, when being loaded and executed, controls the processing system such that it carries out the methods described herein. The systems, components, and/or processes can also be embedded in a computer-readable storage, such as a computer program product or other data programs storage device, readable by a machine, tangibly embodying a program of instructions executable by the machine to perform methods and processes described herein. These elements can also be embedded in an application product which comprises all the features enabling the implementation of the methods described herein and which, when loaded in a processing system, is able to carry out these methods.

The terms "a" and an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ," as used herein, refers to and encompasses any and all possible combinations of one or more of the associated listed items. As an example, the phrase "at least one of A, B, and C" includes A only, B only, C only, or any combination thereof (e.g., AB, AC, BC, or ABC).

The term "substantially" and/or "about," as used herein, include exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degrees/percent/units or less. In some examples, "substantially" can include being within normal manufacturing tolerances.

The aspects herein can be embodied in other forms without departing from the spirit or essential attributes thereof. Accordingly, reference should be made to the following claims, rather than to the foregoing specification, as indicating the scope of the invention.

What is claimed is:

1. A regenerative braking control system, comprising:
one or more user interface elements located in a cabin of a vehicle and corresponding to three regenerative braking settings corresponding to low, medium, and high amounts of regenerative braking torque to apply to one or more wheels of the vehicle; and
a processor operatively connected to the user interface elements and configured to:
detect a condition, the condition being an operator of the vehicle switching rapidly between two or more of the three regenerative braking settings; and
responsive to detecting the condition, dynamically causing in real-time a range of regenerative braking torque between two of the regenerative braking settings to be adjusted based on the condition.

2. The regenerative braking control system of claim 1, wherein the one or more user interface elements is at least one switch.

3. The regenerative braking control system of claim 1, wherein the one or more user interface elements is a graphical user interface.

4. The regenerative braking control system of claim 1, further comprising a sensor configured to detect the usage of one or more of the three regenerative braking settings by the operator of the vehicle, wherein the sensor is operatively connected to the processor and to the one or more user interface elements.

5. The regenerative braking control system of claim 1, wherein the three regenerative braking settings correspond to a range of regenerative braking torque.

6. The regenerative braking control system of claim 1, wherein dynamically causing in real-time a range of regenerative braking torque between two of the regenerative braking settings to be adjusted based on the condition includes adjusting the amount of regenerative braking torque for the two user interface elements that the operator is rapidly switching between.

* * * * *